United States Patent

[11] 3,525,293

[72] Inventor Donald M. Harvey
Rochester, New York
[21] Appl. No. 709,463
[22] Filed Feb. 29, 1968
[45] Patented Aug. 25, 1970
[73] Assignee Eastman Kodak Company
Rochester, New York
a corporation of New Jersey

[54] CAMERA FOR EXPOSING AND PROCESSING SLIDE TRANSPARENCY UNITS
10 Claims, 6 Drawing Figs.
[52] U.S. Cl. ............... 95/13, 95/19
[51] Int. Cl. ............... G03b 17/50
[50] Field of Search ............... 95/13, 89, 25, 26, 19

[56] References Cited
UNITED STATES PATENTS
478,780  6/1892  Bristol ............... 95/26
3,350,990  11/1967  Finelli et al. ............... 95/13

Primary Examiner— Norton Ansher
Assistant Examiner— Richard L. Moses
Attorney— Robert W. Hampton and Gary D. Fields ABSTRACT: A camera wherein slide transparency units can be transported from a storage chamber by a first slide mechanism to an exposure chamber. After exposure, the transparency unit can be transported from the exposure chamber to a developing chamber by a second slide mechanism while another transparency unit is transported from the storage chamber to the exposure chamber by the first slide member. The camera may be reloaded while transparency units remain in the exposure chamber and developing chamber, respectively.

Patented Aug. 25, 1970

DONALD M. HARVEY
INVENTOR.

BY Gary D. Field
Robert W. Hampton

ATTORNEYS

Patented Aug. 25, 1970

DONALD M. HARVEY
INVENTOR.

BY *Gary D. Fields*
*Robert W. Hampton*

ATTORNEYS

CAMERA FOR EXPOSING AND PROCESSING SLIDE TRANSPARENCY UNITS

CROSS-REFERENCES TO RELATED APPLICATIONS

Reference is made to commonly assigned copending U.S. patent applications: Ser. No. 675,597, entitled "Camera and Method for Exposing and Developing Slide Transparency Units," filed Oct. 16, 1967, in the name of Hubert Nerwin; and Ser. No. 695,769, entitled "Camera for Exposing and Developing Slide Transparency Units," filed Jan. 4, 1968, in the name of Donald M. Harvey. Reference is also made in commonly assigned U.S. Pat. No. 3,352,674 entitled "Process and Produce for Image Transfer Photography" which issued on Nov. 14, 1967, in the name of Donald M. Harvey.

BACKGROUND OF THE INVENTION

1. Field of the Invention

This invention relates to a camera for processing a latent image on a film within a camera after exposure. More particularly, the present invention is directed to a camera wherein slide transparency units may be exposed and developed within the camera and then removed for viewing.

2. Description of the Prior Art

A number of techniques have been developed whereby photosensitive material may be exposed within a camera and then developed and transferred to an image-receiving sheet to provide a positive print. However, the development of cameras which can process slide transparencies has not been undertaken to any great extent. U.S. Pat. No. 3,225,670 to M. Friedman et al. is directed to a 35mm system in which separate slide transparency units are mounted in an exposure chamber of a camera with leaders extending through a processing chamber and out of the camera. After exposure, each slide is successively pulled into the development chamber causing a processing fluid contained in a single rupturable pod to be spread across the transparency. After an appropriate development period, the transparency is pulled from the camera for viewing. This camera has a potential disadvantage that the wrong leader may be pulled or that more than one leader may be pulled at the same time jamming the slides in the camera mechanism.

A camera in which the slide transparency units are advanced by pusher or slide mechanism is disclosed in U.S. Pat. No. 3,350,990 to Finelli et al. in which a processing chamber is arranged adjacent a combination exposure and storage chamber wherein an exposed transparency unit is moved from an exposure plane in the storage chamber to an adjacent processing chamber.

Most prior art cameras which also develop film are relatively bulky and hard to handle. Also no provision is made for loading additional film in the camera when the last film unit is still in the camera.

SUMMARY OF THE INVENTION

In the present invention, a compact camera is provided wherein transparency units are mounted in a storage chamber adjacent the exposure chamber so that they may be sequentially moved by a first slide mechanism into the exposure chamber. After exposure, the transparency unit is moved by a second slide member into a developing chamber which is located behind the storage chamber while simultaneously the first slide moves a second transparency unit into the exposure chamber. As a slide moves a transparency unit into the developing chamber, pod rupturing means, such as a roller mounted, therein causes a pod carried by the transparency unit and containing developing fluid to be ruptured so that a nonviscous developing agent or fluid is spread between the transparency and a cover sheet by means of a pressure pad in accordance with the process disclosed in my commonly assigned U.S. Pat. No. 3,352,674 which issued on November 14, 1967, to assure the developing agent contacts all of the exposed film area. After a suitable development period has elapsed, a door in the developing chamber is opened so that the developed transparency unit may be removed for viewing. Also, it will be apparent that while one transparency unit is being developed in the developing chamber, a subsequent exposure may be made of the transparency unit in the exposure chamber. Also, when the last transparency unit is in the exposure chamber, a new supply of transparency units may be placed in the storage chamber for subsequent use, if desired.

It will be understood that the term "transparency" as used herein refers to the film area to be exposed, whether in its unexposed latent image or developed condition.

Additional novel features of this invention will become apparent from the description which follows, taken in conjunction with the accompanying drawings.

DESCRIPTION OF THE PREFERRED EMBODIMENT

Figure 1:
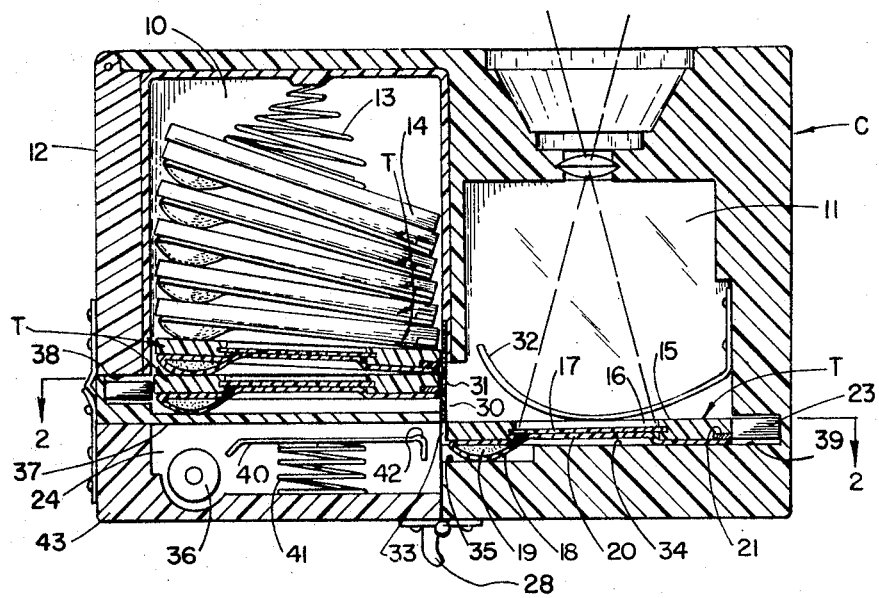
FIG. 1 is a longitudinal section through the top of a camera constructed in accordance with this invention, showing a slide transparency unit in the exposure chamber.

In accordance with this invention, a camera C is provided in which a transparency unit can be developed immediately after exposure. The camera has a storage compartment or chamber 10, as clearly shown in FIG. 1, located adjacent an exposure compartment or chamber 11. Conveniently, chamber 10 is provided with a door 12 for receiving a plurality of slide transparency units T, which are urged toward the rear of chamber 10 by a spring 13 bearing against a plate 14. Of course, the slide transparency units may be mounted in a suitable magazine or other device for supplying them to the camera, if desired.

The transparency unit, as best seen in FIG. 1, may include a mount 15 having planar surfaces and a central opening 16 across which a transparency 17 extends. A rupturable pod 18 containing a nonviscous fluid developing agent 19, is located at one side of opening 16 and is held in position against one of the planar surfaces by a strippable sheet 20 extending over the pod and opening. Thus, when the pod is ruptured, as described below, developing agent 19 will be spread across transparency 17 within a space formed between the transparency and strippable sheet 20, as more fully explained below. Advantageously, an absorbent material 21 is provided under strippable sheet 20 on the opposite side of opening 16 from pod 18 to absorb any unused developing agent.

Figure 2:
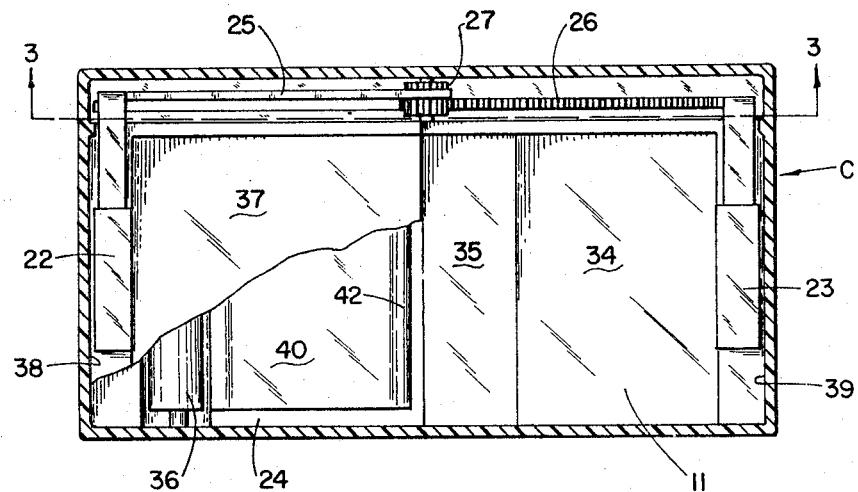
FIG. 2 is an offset section, taken along line 2—2 of FIG. 1, showing the slide assembly for transporting the transparency units through the camera.
Figure 3:
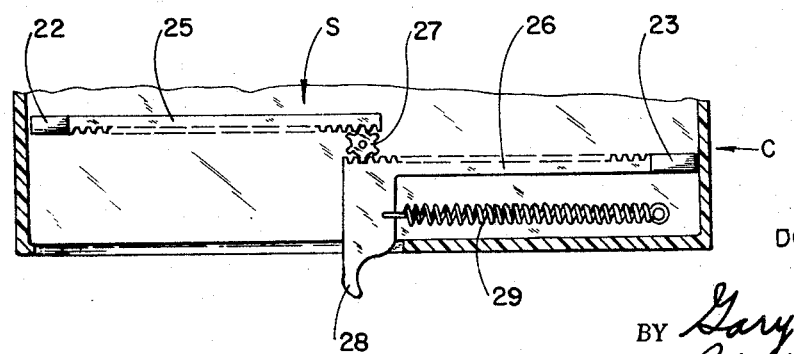
FIG. 3 is a longitudinal, fragmentary section, taken along line 3—3 of FIG. 2, showing further details of the slide assembly.

As best seen in FIGS. 2 and 3, the transparency units T are moved through the camera by a reciprocative member, such as slide assembly S, which includes a first transparency unit engaging arm 22 for moving the transparency units from storage chamber 10 to exposure chamber 11 and a second transparency unit engaging arm 23 for moving a transparency unit from the exposure chamber to a developing chamber 24 located behind storage chamber 10. Arms 22 and 23 are connected to slide members or racks 25 and 26, respectively, and are interconnected by a pinion 27, as seen in FIG. 3. The slide assembly may be actuated by a lever 28 connected to rack 26 and is held in a retracted position by spring 29, as shown in FIG. 3.

To move one of transparency units T from storage chamber 10 to exposure chamber 11, lever 28 is pushed to the left, as viewed in FIG. 3, so that arm 22 engages and pulls a transparency unit T through a passageway or opening 30 between storage chamber 10 and exposure chamber 11 which is normally covered by a light lock 31. For convenience of illustration, an exposed transparency unit T has also been shown in exposure position in chamber 11 in FIG. 1. Thus, the operation of both slide mechanisms may be discussed together.

Figure 4:
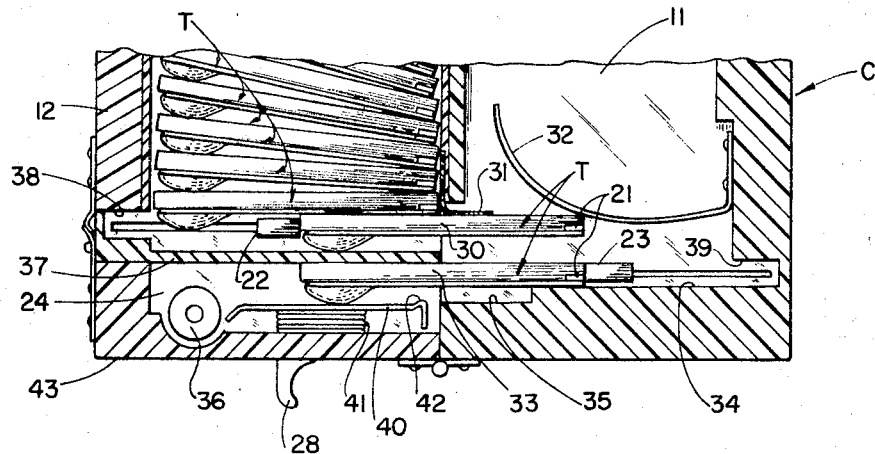
FIG. 4 is a longitudinal, fragmentary section showing one transparency unit being moved from the exposure chamber to the developing chamber and another transparency unit being moved from the storage chamber to the exposure chamber.
Figure 5:
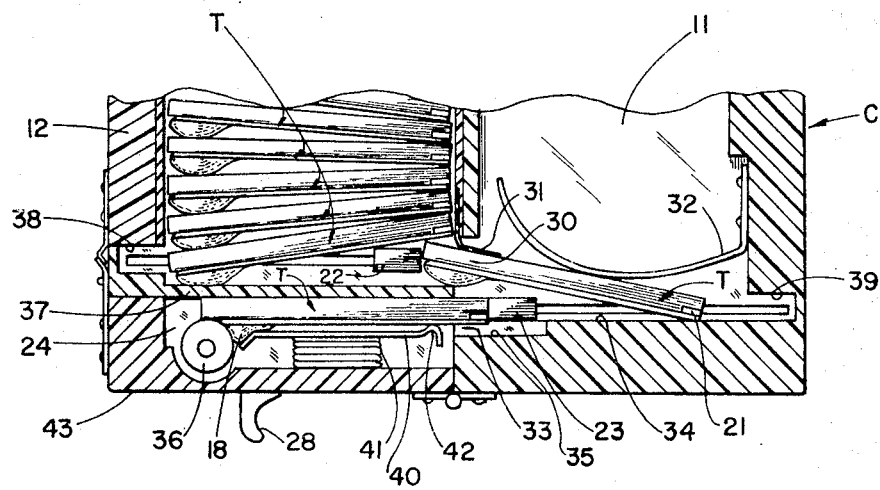
FIG. 5 is a fragmentary, horizontal section, similar to FIG. 4, but showing the final positioning of the one transparency unit in the developing chamber and the other transparency unit in the exposure chamber.

Looking at FIG. 4, as a transparency unit T is being moved through passageway 30 into exposure chamber 11, a leaf spring 32 within the exposure chamber will be cammed upwardly, as shown, and the transparency unit which was within the exposure chamber 11 is pushed by arm 23 through passageway 33 into developing chamber 24. As the movement of the transparency units continue under the operation of lever 28 and gear 27 on racks 25 and 26, the transparency unit entering exposure chamber 11 will be cammed downwardly by spring 33 to be held in an exposure plane between spring 32 and rear wall 34 of exposure chamber 11. Conveniently spring 32 is positioned so as to engage one side of mount 15 and not bear against transparency 17. Of course, a second spring could be provided which would bear against mount 15 on the other side of transparency 17 or spring 32 could be approximately as wide as mount 15 with a central opening through which transparency 17 could be exposed. A recess 35 is provided in rear wall 34 to accommodate pod 18 of the transparency unit.

As a transparency unit is moved through passageway 33, pod 18 will be ruptured by engagement with roller 36 which is spaced from wall 37 separating storage chamber 10 and developing chamber 24 a distance approximately equal to the thickness of mount 15 so that rupturing of pod 18 is assured. Upon release of operating lever 28, slide assembly S will return to its retracted position under the influence of spring 29 with arm 22 sliding between the rearmost transparency unit T in storage chamber 10 and plate 37 so that it is received in notch 38 in the sidewall of the camera. The other arm 23 slides back under the transparency unit in the exposure chamber into a notch 39 in the sidewall thereof.

Figure 6:
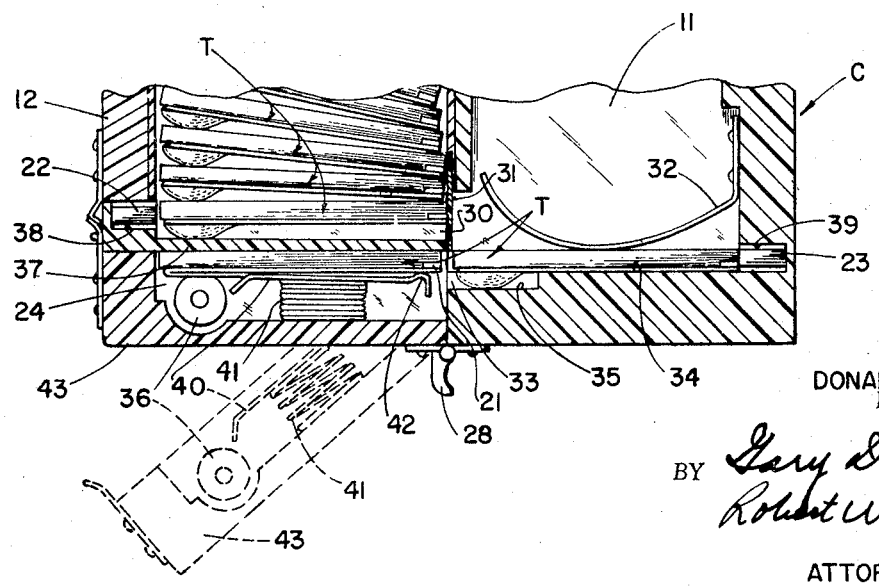
FIG. 6 is a fragmentary, horizontal section, similar to FIGS. 4 and 5, but showing the one transparency unit in developing position in the developing chamber and the other transparency unit in position in the exposure chamber with the door on the exposure chamber shown in partially open position in dotted lines.

Within development chamber 24 is a pressure pad 40 which is urged against cover sheet 20 of a transparency unit in the chamber, as by a coil spring 41 to create a hydraulic pressure on the developing fluid in the space between sheet 20 and transparency 17, thereby assuring that there is no fluid developer starvation anywhere across the transparency, particularly at the corners. Pressure pad 40 is provided with ridge or shoulder 42 which bears against cover sheet 20 between transparency 17 and absorbent material 21 so that the fluid is not absorbed by the latter during the processing operation. Upon completion of the developing period, door 43 is opened, as shown on dotted lines in FIG. 6, so as to pull pressure pad 40 away from the transparency unit permitting any unabsorbed developing agent to be absorbed by absorbent material 21. Thereafter, the transparency unit can be removed from the camera, and strippable sheet 20, pod 18 and absorbent material 20 can then be stripped therefrom so that the unit is ready for viewing.

It will be apparent that once the last transparency has been transported from the storage chamber into the exposure chamber, a new supply of unexposed transparency units may be inserted in storage chamber 10, so long as light lock 31, such as velvet, is provided between the storage chamber and exposure chamber 11. Thus, it is possible to reload the camera whenever the storage chamber is empty, even though units may remain in the exposure and/or developing chambers. Thus, some degree of flexibility is provided in reloading so that the photographer may choose the time of reloading so as not to interfere with a good picture taking opportunity.

From the foregoing, it can be seen that the novel features of this invention and the advantages thereof are readily apparent. A camera has been provided having a storage chamber for unexposed transparency units adjacent an exposure chamber and a developing chamber located rearwardly of the storage chamber. In addition, the camera is provided with two interconnected slide means for transporting the slide transparency units through the camera. As one transparency unit is moved from the storage chamber into the exposure chamber, another transparency unit may be moved from the exposure chamber into the developing chamber. Also, while the transparency unit in the developing chamber is being developed, the transparency unit in the exposure chamber may be exposed to a scene to be photographed. The particular arrangement of the chambers provides for a compact, easy to handle camera. In addition, the arrangement of chambers permits reloading while transparency units still remain in either or both the developing chamber and the exposing chamber.

The invention has been described in detail with particular reference to a preferred embodiment thereof, but it will be understood that variations and modifications can be effected within the spirit and scope of the invention as described hereinabove and as defined in the appended claims.

I claim:

1. A camera for exposing and initiating the development of photographic units receivable in the camera, said units including a photosensitive portion and a rupturable pod for releasing developing agent onto said photosensitive portion, said camera comprising:
   an exposure chamber having an exposure plane;
   a storage chamber adapted to receive a plurality of unexposed photographic units;
   a first passageway interconnecting said chambers through which said photographic units may be transported sequentially from said storage chamber to said exposure chamber;
   first reciprocative means, mounted for movement in said storage chamber for engaging an unexposed photographic unit in said chamber to transport said unexposed unit from said storage chamber through said first passageway and into said exposure chamber;
   a second passageway leading from said exposure chamber through which said photographic units may be transported from said exposure chamber;
   second reciprocative means, mounted for movement in said exposure chamber, and engageable with an exposed photographic unit in said chamber to transport said exposed unit from said exposure chamber through said second passageway, said second reciprocative means being coupled to said first reciprocative means for synchronous operation therewith; and
   rupture means engageable with said pod on said units transported through said second passageway for rupturing said pod and causing said developing agent to be spread across said photosensitive portion.

2. A camera as claimed in claim 1 further including:
   a developing chamber interconnected with said exposure chamber by said second passageway, said developing chamber enclosing said rupture means, and into which chamber said second reciprocative means can transport exposed photographic units from said exposure chamber through said second passageway.

3. A camera as claimed in claim 1 further including:
   means defining a recess in said exposure chamber for receiving said pod when a photographic unit is in an exposure plane.

4. A camera as claimed in claim 2 further including:
   a first rack on said first reciprocative means;
   a second rack on said second reciprocative means;
   a pinion engaging said first and second racks, respectively, so that said first and second reciprocative means move in synchronous relation; and an operating lever connected to one of said reciprocative means for actuating each of said first and second reciprocative means for movement from an inoperative position to transport a photographic unit from said storage chamber to said exposure chamber and to transport a photographic unit from said exposure chamber to said developing chamber, respectively.

5. A camera as claimed in claim 4 further including:
a first arm extending from said first rack engageable with an unexposed photographic unit in said storage chamber to transport said unexposed unit through said first passageway into said exposure chamber;
a second arm extending from said second rack engageable with an exposed photographic unit in said exposure chamber to transport said exposed unit through said second passageway into said developing chamber;
first means defining a recess in said storage chamber for receiving said first arm when in said inoperative position; and
second means defining a recess in said exposure chamber for receiving said second arm when in said inoperative position.

6. A camera as claimed in claim 1 further including:
resilient means in said exposure chamber for urging an unexposed transparency unit into said exposure plane.

7. A camera as claimed in claim 6 wherein said biasing means includes:
a leaf spring having one end attached to said exposure chamber.

8. A camera for exposing and initiating the development of slide transparency units, said units including a photosensitive portion and a rupturable pod containing developing agent, said camera comprising:
a housing having a pair of spaced side walls interconnected by a pair of spaced end walls;
a center wall extending from one of said side walls toward the other of said side walls to divide said housing into an exposure chamber and a section including a storage chamber for receiving a plurality of unexposed transparency units, and terminating in an end spaced from said other sidewall;
a support plate extending from the end wall of said section toward said exposure chamber to divide said section into said storage chamber and a developing chamber and terminating in an end spaced from said center wall, forming a first passageway between said storage chamber and said exposure chamber and forming a second passageway between said exposure chamber and said developing chamber;
first reciprocative means, mounted for movement in said storage chamber, engageable with an unexposed transparency unit for transporting said unexposed unit from said storage chamber through said first passageway into said exposure chamber;
second reciprocative means, mounted for movement in said exposure chamber, engageable with an exposed transparency unit for transporting said exposed unit from said exposure chamber through said second passageway into said developing chamber; and
rupture means in said developing chamber engageable with said pod for rupturing said pod and causing said developing agent to be spread across said photosensitive portion.

9. A camera as claimed in claim 8 wherein said units include a strippable layer extending over said pod and said photosensitive portion, said camera further including:
a pressure pad in said developing chamber resiliently urged toward said plate and engageable with said strippable layer to exert a pressure thereon to cause said developing agent to be spread across said photosensitive portion.

10. A camera, as claimed in claim 9 wherein said units further include an absorbent material adjacent said photosensitive portion, and said pressure pad further includes:
a shoulder engageable with said layer between said photosensitive portion and said absorbent material to prevent said developing agent from being absorbed by said absorbing material during development of said photosensitive portion.